US010824869B2

(12) United States Patent
Tibau-Puig et al.

(10) Patent No.: US 10,824,869 B2
(45) Date of Patent: Nov. 3, 2020

(54) CLICKLESS IDENTIFICATION AND ONLINE POSTING

(71) Applicant: OLX B. V., Amsterdam (NL)

(72) Inventors: Arnau Tibau-Puig, Barcelona (ES); Carles Grau, Barcelona (ES); Nestor Garcia, Barcelona (ES); Xavier Gil, Barcelona (ES); Julien Meynet, Barcelona (ES); Luca Cerone, Barcelona (ES); Carlos González, Barcelona (ES); Jordi Castelló, Singapore (SG)

(73) Assignee: OLX B.V., Amsterdam (NL)

( * ) Notice: Subject to any disclaimer, the term of this patent is extended or adjusted under 35 U.S.C. 154(b) by 0 days.

(21) Appl. No.: 16/354,738

(22) Filed: Mar. 15, 2019

(65) Prior Publication Data

US 2019/0294879 A1 Sep. 26, 2019

Related U.S. Application Data

(60) Provisional application No. 62/645,362, filed on Mar. 20, 2018.

(51) Int. Cl.
| | | |
|---|---|---|
| *G06K 9/00* | (2006.01) | |
| *G06K 9/62* | (2006.01) | |
| *G06F 16/2455* | (2019.01) | |
| *G06Q 30/06* | (2012.01) | |

(52) U.S. Cl.
CPC ... *G06K 9/00671* (2013.01); *G06F 16/24568* (2019.01); *G06K 9/6256* (2013.01); *G06Q 30/0625* (2013.01)

(58) Field of Classification Search
CPC .... G06K 9/00671; G06K 9/6256; G06K 9/00; G06K 9/62; G06K 9/6262; G06K 9/3241; G06F 16/24568; G06F 16/9535; G06F 16/2455; G06F 16/27; G06F 16/338; G06Q 30/0625; G06Q 30/06; G06N 20/00; G06N 3/08; G06N 3/0454; G06T 2207/20081; G06T 2207/20084
See application file for complete search history.

(56) References Cited

U.S. PATENT DOCUMENTS

| | | | |
|---|---|---|---|
| 10,366,439 B2 * | 7/2019 | Leonard | G06Q 30/0639 |
| 2011/0099085 A1 * | 4/2011 | Hamilton | G06Q 30/0613 |
| | | | 705/26.41 |

(Continued)

*Primary Examiner* — Xilin Guo
(74) *Attorney, Agent, or Firm* — Buckley, Maschoff & Talwalkar LLC

(57) ABSTRACT

Provided are systems, devices, and methods for clickless identification of an object and clickless posting of an online listing corresponding to the identified object. In one example, a method may include one or more of identifying an object included in image data obtained via a clickless image identification process, wherein the identifying is performed while the image data is being captured by an image capturing component associated with a mobile device, predicting one or more attributes of the identified object based on previous data of similar objects posted on a web resource, and displaying an identifier of the identified object and the one or more predicted attributes of the identified object on a screen of the mobile device while the clickless image identification process is occurring.

20 Claims, 9 Drawing Sheets

(56) References Cited

U.S. PATENT DOCUMENTS

| | | | |
|---|---|---|---|
| 2013/0278777 A1* | 10/2013 | Sweet, III | H04N 5/225 |
| | | | 348/169 |
| 2016/0092732 A1* | 3/2016 | Black | G06T 11/60 |
| | | | 382/103 |
| 2019/0066304 A1* | 2/2019 | Hirano | H04N 5/23293 |
| 2019/0080171 A1* | 3/2019 | Zheng | G06T 11/60 |

* cited by examiner

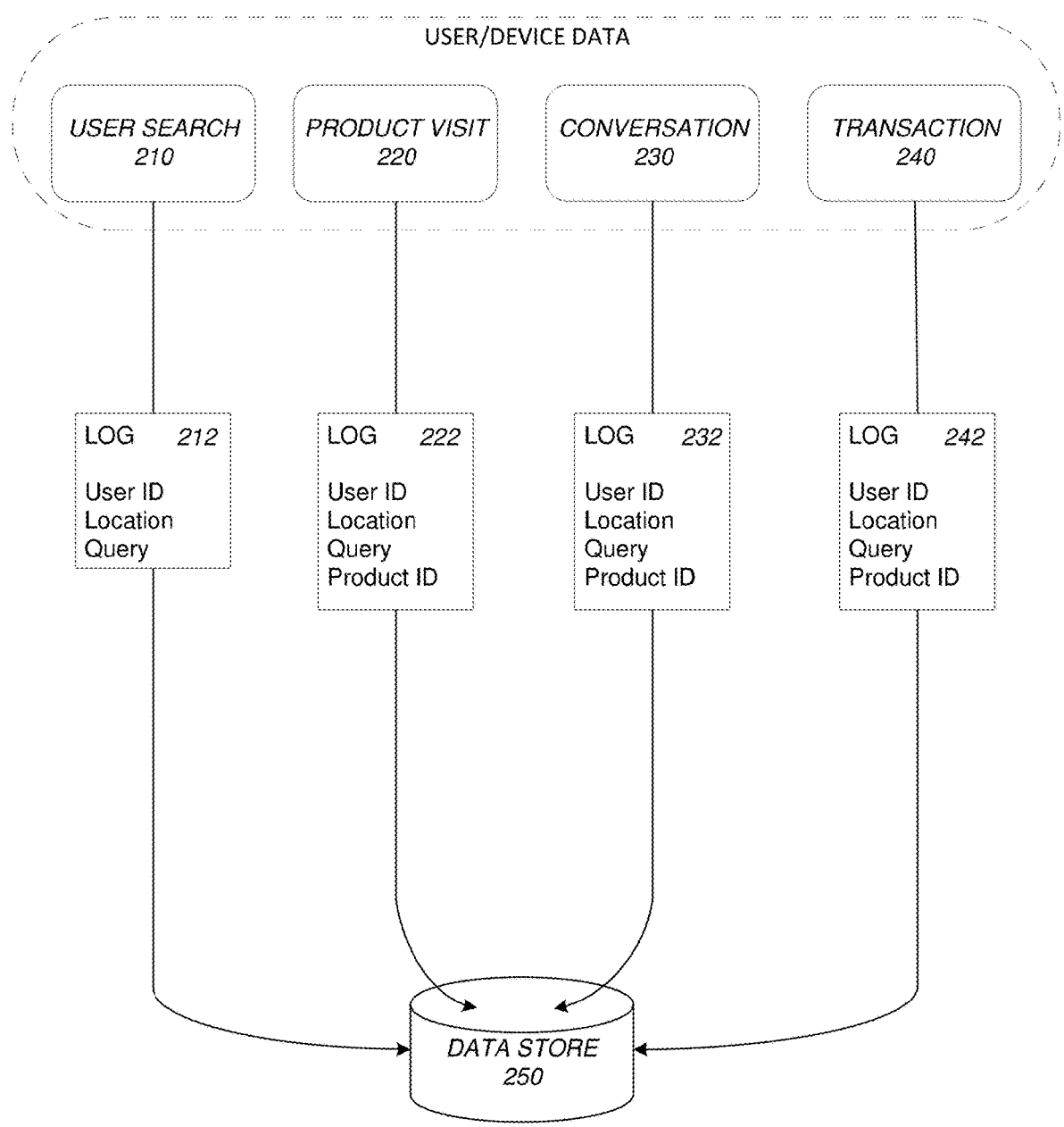

(Training)

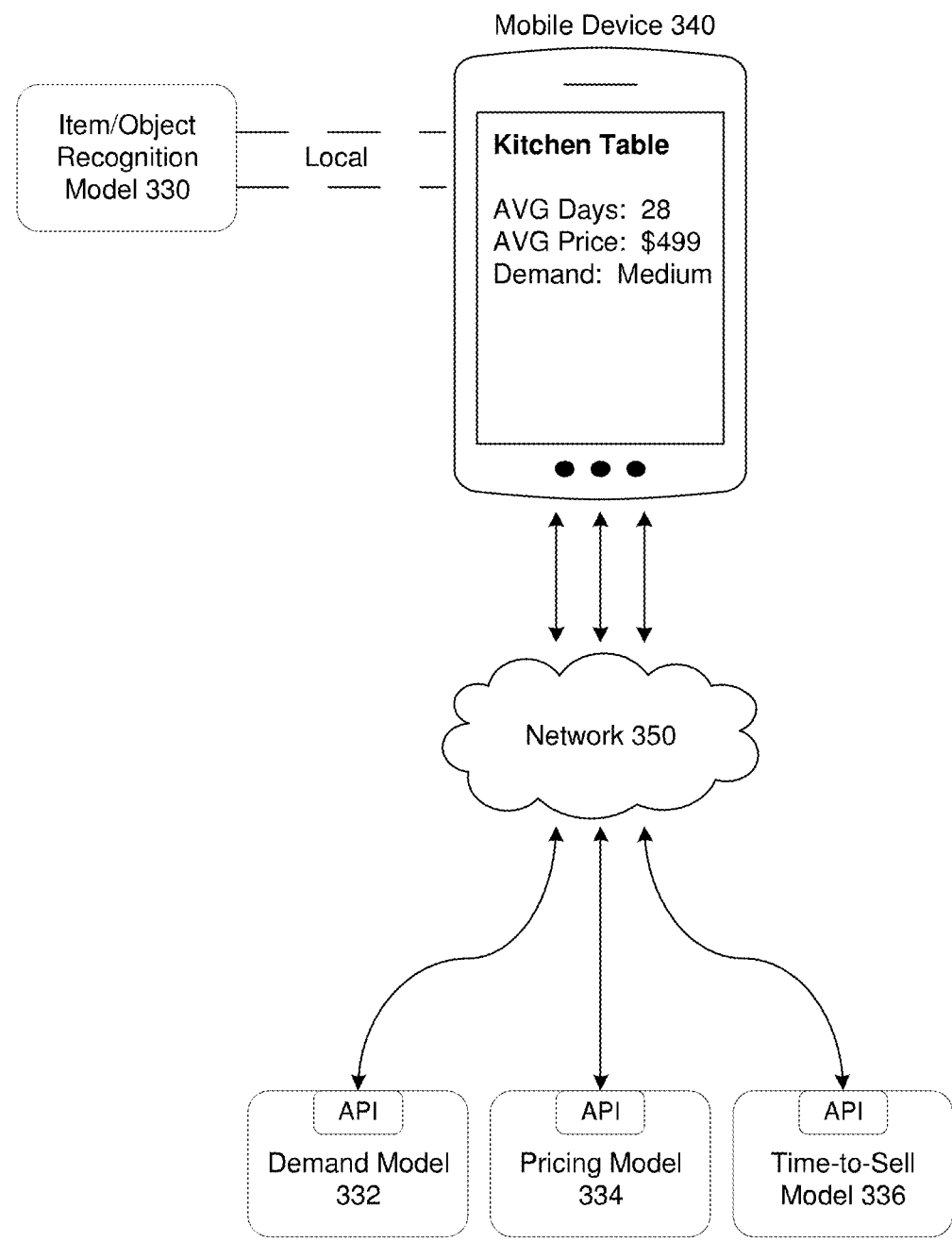

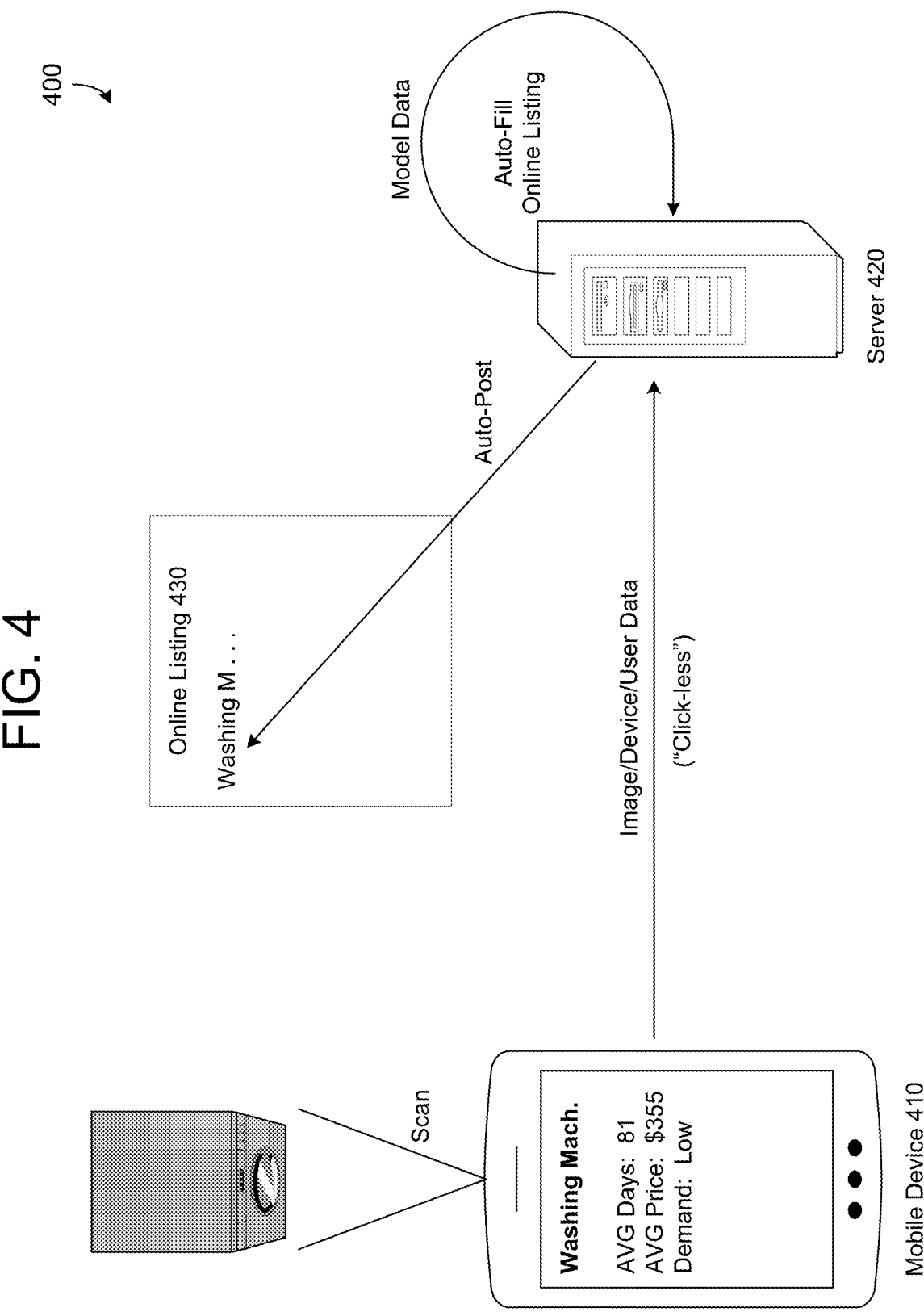

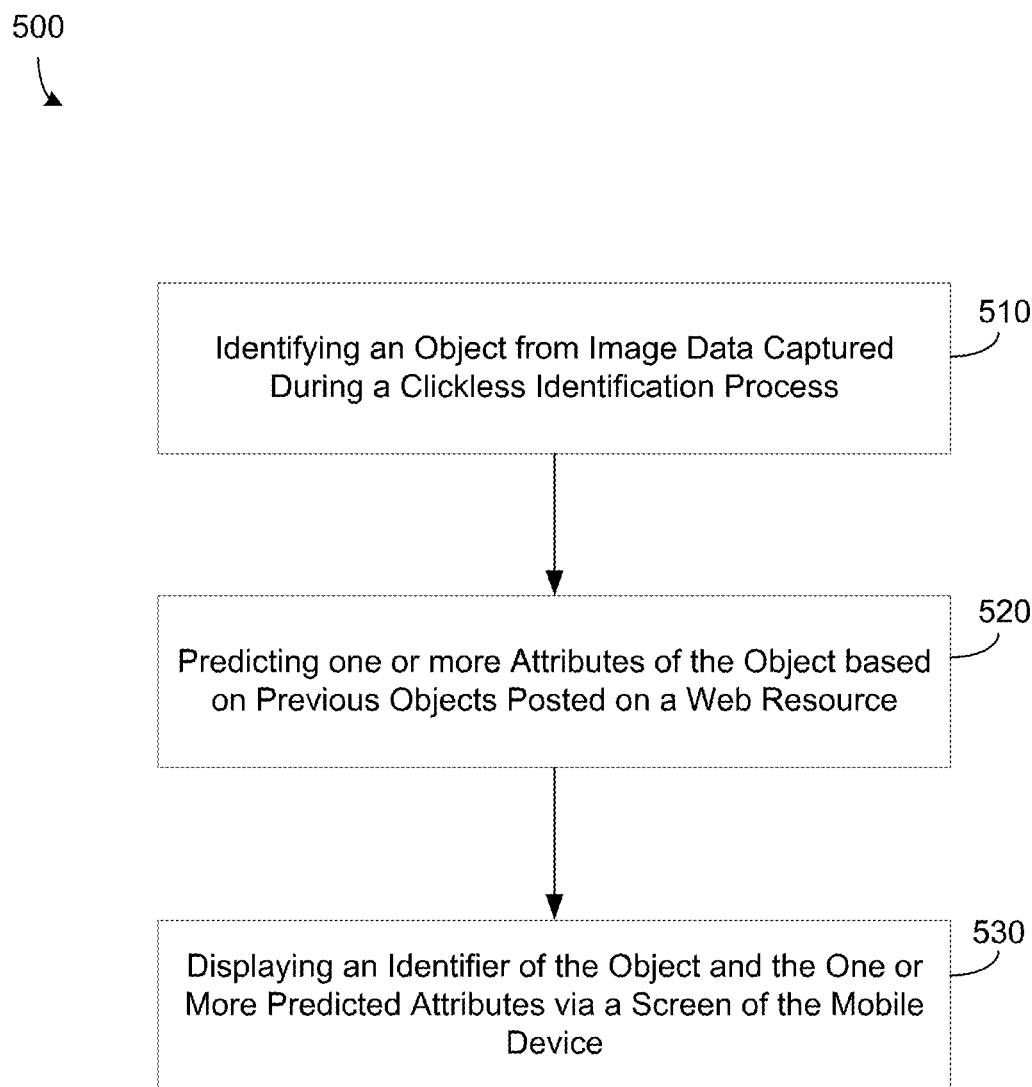

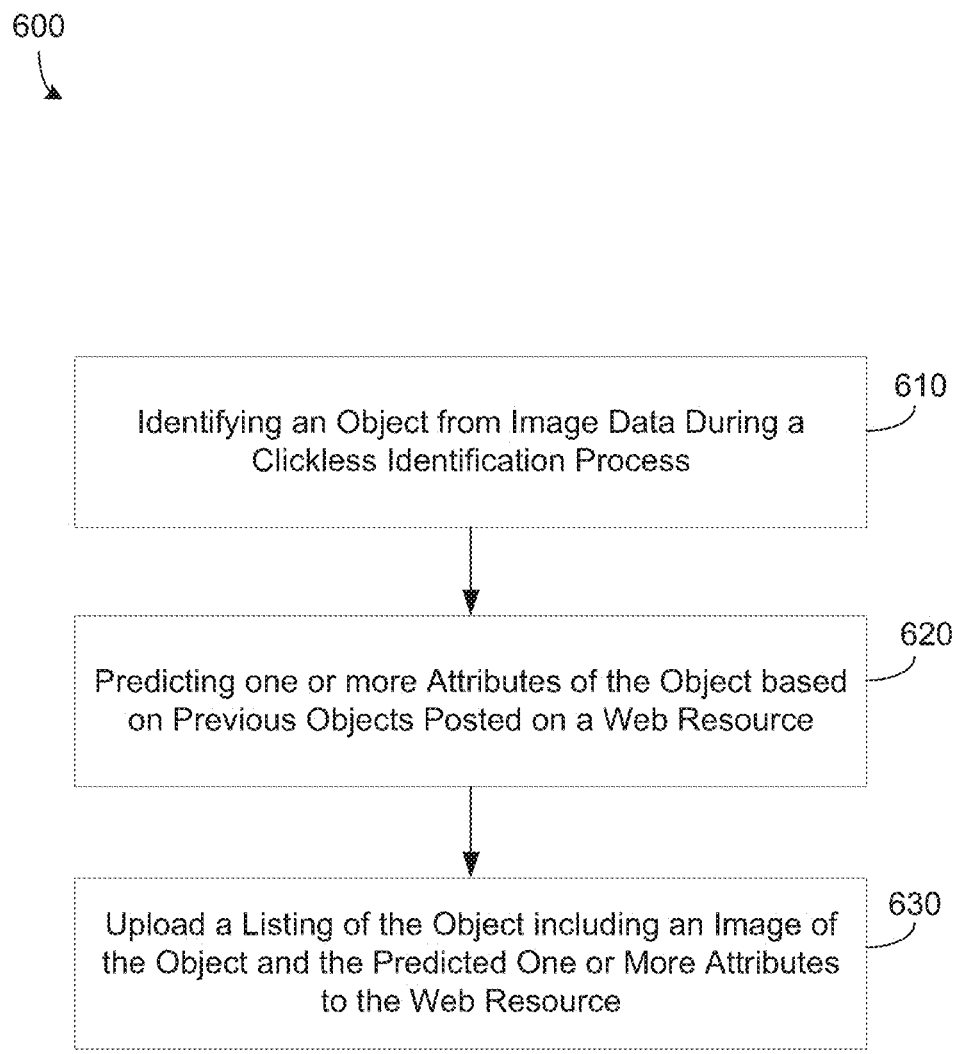

CLICKLESS IDENTIFICATION AND ONLINE POSTING

CROSS-REFERENCE TO RELATED APPLICATIONS

This application claims the benefit under 35 USC § 119(e) of US Provisional Patent Application No. 62/645,362, filed on Mar. 20, 2018, the entire disclosure of which is incorporated herein by reference for all purposes.

BACKGROUND

Over time, items you own may begin to feel old and lack value. However, these items may be of significant interest and value to other users. Rather than throw these items away, online services, such as the Letgo® mobile application and other classifieds websites or apps, provide a forum for users to sell/purchase new and second-hand items. Listing an item for sale is a process that typically requires a user to provide information about the item for sale via one or more fields on an online service or mobile application, set a price for the item, and post the item to the online service or mobile application. In some cases, the user may also wish to capture images of the item to provide potential buyers with proof of the quality thereof. Each time a user desires to post an item for sale they must repeat each of these steps and capture images of the new item.

The posting process, however, typically requires a user to manually enter identifying information about the item such as a name, a type, a description, and the like. The information is usually entered via one or more fields on the mobile application or website which require a user to manually type out characters or make selections such as through a drop-down box. In addition, the process often requires the user to set a price for the item even though the user may lack knowledge of supply/demand and lack knowledge of a second-hand value of the item other than the initial purchase price. In other words, the user must guess at various information and take the time to enter this information via the online service in hopes of finding a buyer. Furthermore, users must capture images of the item through a user device and upload the images from the user device to the online service. Furthermore, each of these processes must be repeated each time a user posts a new item. Therefore, an easier and more accurate way to post listings of items would be useful to solve many of these disadvantages.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is a diagram illustrating a system architecture for acquiring training data in accordance with example embodiments.

FIG. 3B is a diagram illustrating a user device interacting with the trained leaning models in accordance with an example embodiment.

FIG. 4 is a diagram illustrating a process of capturing object data and auto-posting a listing of the object to an online service in accordance with an example embodiment.

FIG. 5 is a diagram illustrating a method for clickless identification of an object in accordance with example embodiments.

FIG. 6 is a diagram illustrating a method for clickless posting of a listing for an object in accordance with example embodiments.

Figure 1A:
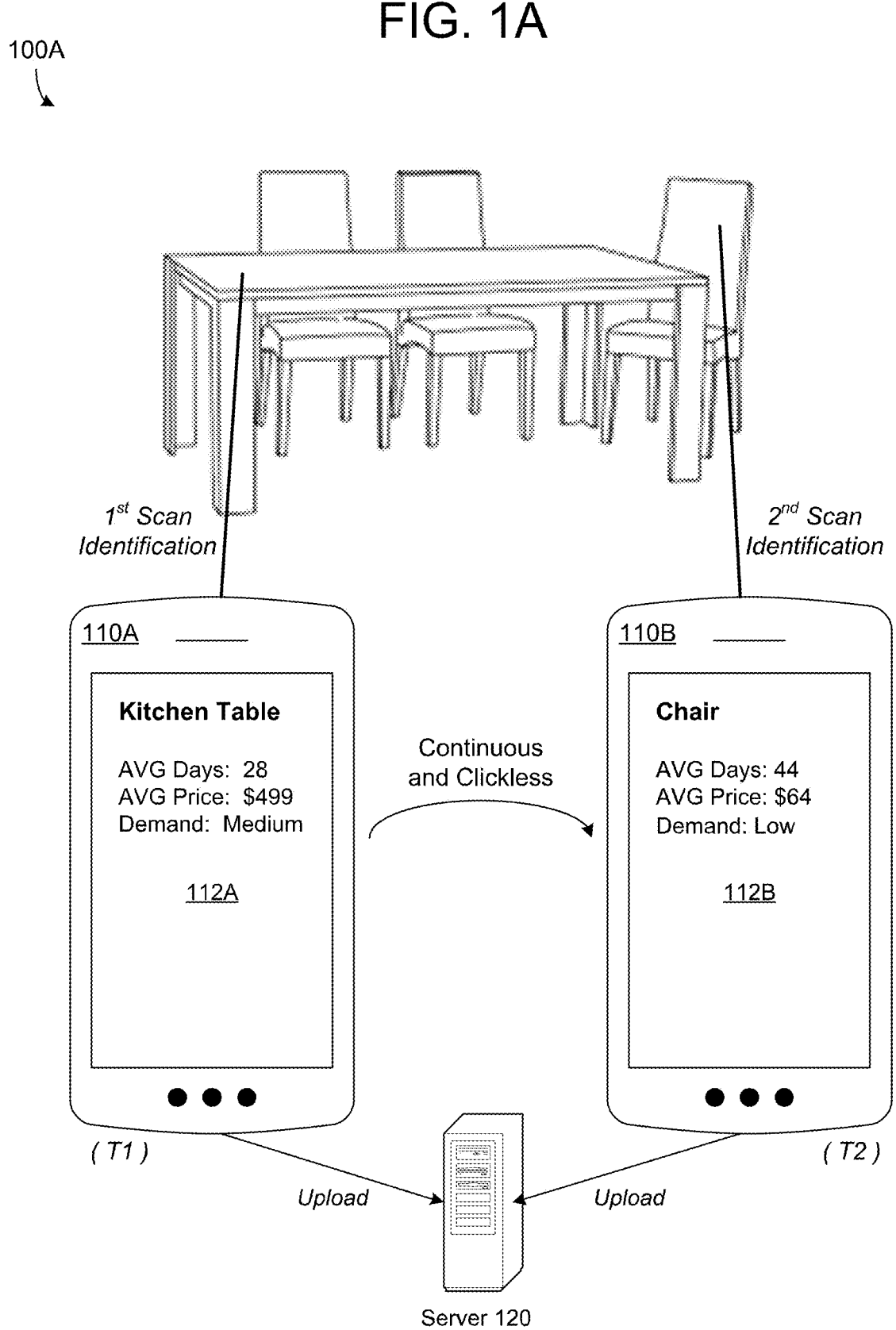
FIG. 1A is a diagram illustrating a clickless process for capturing and posting an online listing in real-time in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system and mobile application that supports clickless identification and posting of online listings. It can be appreciated that this system is applicable to all forms of online listings, including without limitation applications hosted on a desktop web browser or on a mobile device web browser, and the like. An imaging element such as a camera, a video recorder, and the like, which may be embedded or otherwise connected to a user device may be used to scan a room (or other area) and a recognition module of a mobile application executing on the mobile device may automatically identify objects (such as second-hand goods) which can be listed for sale via an online service. As one example, the scanning may be performed by an imaging element of a mobile device, however, embodiments are not limited thereto. As another example, the scanning may be performed by a camera that is connected to a user device via a cable, wirelessly, etc. The recognition process may be performed based on a previously trained imaging model that is trained to identify a type of object included within an image (such as a video or still image).

The object may be classified generally (e.g., backpack, mobile phone, headphones, etc.). As another example, the classification of the object may be more refined (e.g., an Under Armour® backpack, an Apple® iPhone®, Bose® headphones, etc.). The object identification process can happen almost instantaneously and directly from the video stream captured by the device, at a rate of several times per second (as opposed to identifying from static images or pictures). When the object has been identified, information about the object may be simultaneously displayed on the mobile device while the scanning is still occurring. In other words, the user may be holding the mobile device such that an imaging perspective of the camera is positioned on the object and the object identification may populate or otherwise render on the screen such that both the object and the object identification information are simultaneously displayed.

Furthermore, the identification process may be clickless. In other words, the user does not have to enter a command, press a button, speak a vocal command, make a gesture, or any other input command, and the identification process can automatically occur. Furthermore, when the user moves the viewing area of the camera to another object in the room the mobile application may seamlessly remove the information about the previously identified object and populate the display with the next recognized object. This process may continue in real-time while the user continues to scan around a room and the mobile application recognizes new objects.

The mobile application may include the ability to predict or otherwise determine additional information about the identified object without requiring the user to enter any information. For example, the mobile application may predict attributes about the identified object such as a sale price, an amount of time for selling the object, a demand for the object, and the like. The mobile application may include models which are trained based on other historical data posted on any of an online service, a website, a mobile app, and the like, which can be learned from to predict attributes of a newly identified object. Because all of this takes place without a user input, convenience to the user is high and the information identified is accurate therefore preventing a user from incorrectly labeling an object, or mislabeling an object. Furthermore, a price or price range can be provided to the user, and an image can be taken of the object all without the user pressing a button or entering an input.

According to another example embodiment, the automatically identified object that is identified through a seamless or continuous clickless identification process, can be automatically posted to a live online service such as a website or mobile application, which may be broadly referred to herein as a web resource. For example, an online listing may be uploaded and posted based on one or more images captured by the mobile device, identification information (e.g., name, description, type, geographic location, etc.) identified by the mobile application, and one or more attributes (e.g., price, demand, time to sale, etc.) predicted by the mobile application. The online listings may be populated to a user account page, a summary, or some other web resource, where the user who captured the object can view which objects have been recognized and various information automatically identified and predicted about the object. Accordingly, the user may then make a final determination as to which listings to activate or the listings may be automatically activated. The image that is displayed within the online posting may be a live image captured of the object. As another example, the image may be a pre-selected image (e.g., a predefined image, etc.) that is stored by the application and uploaded in response to detecting a type of object that has been scanned. As another example, the predefined image may be an image taken previously by the user device (i.e., an existing picture) that is stored on the user device.

The example embodiments provide a computing system and mobile application that can automate the process of publishing for sale second-hand merchandise on an e-commerce site by utilizing a smartphone and its video camera. For example, software on the smartphone may process a real-time video feed from its camera using a computer vision model to detect and classify objects (also referred to herein as items). Once an object is detected, its name and information about its value and time to sell may be retrieved from a location-sensitive product database (LPD) in order to automatically fill the posting form. The image and posting form are uploaded to the online service for viewing by interested buyers.

In some embodiments, the computer vision model used to detect and classify objects may be a convolutional neural networks (CNN) model. However, the embodiments are not limited thereto. Any known computer vision model and application can be used to detect and classify the object. For example, deep learning, or the like, could be used to perform an object detection and classification.

In some embodiments, both the computer vision model and LPD used in the mobile device may be produced and updated on a regular basis directly by the online service. The computer vision model may be trained with large sets of images of products of previous inventory in order to recognize new items/objects. In some cases, the users may help refine the training data based on user searches, conversations, and the like, which may unveil false positives or false negatives in the training data. The computer vision model may be able to recognize thousands of objects from multiple angles and or colors. The LPD database may be built from the product information and inventory systems of the service, and may contain information such as product names, price/liquidity metadata for generating price suggestions, time to sell data, and the like.

Figure 1B:
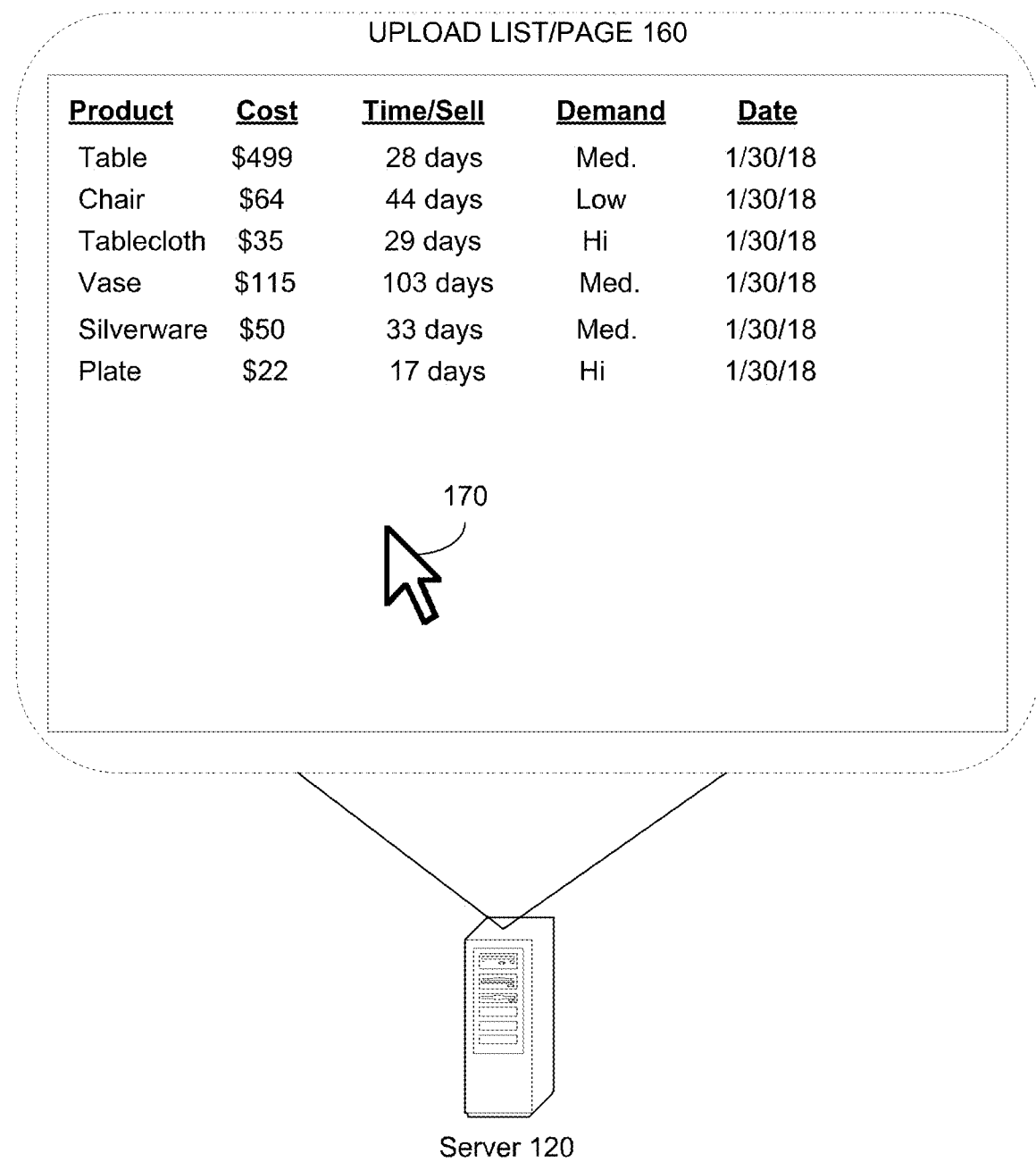
FIG. 1B is a diagram illustrating a user interface for reviewing online listings being posted via a clickless process, in accordance with an example embodiment.

FIG. 1A illustrates a clickless process 100A for capturing and posting an online listing in real-time in accordance with an example embodiment, and FIG. 1B illustrates a user interface 100B for reviewing listings being posted via a clickless process, in accordance with an example embodiment. Referring to the process 100A of FIG. 1A, a user may control a mobile device 110 to focus a camera on various objects in a room without having the select a button or input a command, referred to as a continuous clickless identification operation. A mobile application executing on the mobile device 110 may automatically identify an object based on an object recognition model stored locally on the mobile device 110 and capable of identifying objects in real time. Information about the detected object may be transmitted from the mobile device 1010 to a server 120 which may be associated with the mobile application. For example, the server 120 may host the mobile application on the Internet and may be connected to the mobile device through the Internet, however, embodiments are not limited thereto. In this example, the server 120 may include additional models such as a product database that can predict a sale price of the object identified from the object recognition model on the mobile device 110, as well as predict a time to sale, a demand, and the like.

Furthermore, a description (name, type, product ID, classification, etc.) or other identifier such as a drawing, cartoon, generalized image, etc., of the identified object may be displayed on a screen 112 of the mobile device 110 while the mobile device continues to execute the clickless identification process including the scanning of the room. Each time a new object is identified, the information about the object, and predicted information about the object may be displayed on the screen 112 of the mobile device.

In particular, the example of FIG. 1A shows a process 100A of a mobile device 110 being used to scan objects such as a table and chairs. During a first-time step, the mobile device 110A captures an image of a table. This identification may be performed by a local computer vision model on the mobile device. Furthermore, information about the identified table can be transmitted to the server 120 for additional process based on learning models previously stored at the server 120. In this example, the models predict an average price, a median price, etc., of the table, an average sale time of the table, and a demand of the table. This information can then be displayed (in real-time) on the user interface 112A which is implemented via a screen of the mobile device.

Without stopping the continuous clickless identification process, the user may move a field of view of a camera of the mobile device to a next object in the room, which in step 2 of this example is a chair, identified by mobile device 110B. In response, the chair can be identified by a local computer vision model on the mobile device, and the information about the identified chair can be transmitted to the connected server 120. Additional information about the chair can be predicted using one or more models on the server, and transmitted to the mobile device 110B, where they can be displayed by the user interface 112B. Although two iterations are shown in the example of FIG. 1A, it should be appreciated that many objects may be scanned via a single continuous clickless scanning operation, and each scanned object may trigger another iteration which includes object identification, prediction, and display of the object information on the screen of the mobile device.

Referring to FIG. 1B, in the process 100B, objects that are scanned via the process 100A shown in FIG. 1A, are uploaded and automatically posted to an online resource 160 which in this example is a web page, although embodiments are not limited thereto and could include other online resources such as mobile applications, databases, platforms, and the like. Here, the web page 160 is hosted by the server 120, however embodiments are not limited thereto. In this example, each object detected via the continuous clickless scanning operation automatically posts a new listing to the web page 160 without requiring the user to generate an input or otherwise submit a command. Furthermore, the web page 160 may be a loading page on a user account which includes additional processing options enabling the user to make a final decision on whether to go live with a web listing, or the web page 160 may be a live online listing via a mobile application thereby enabling the automatically identified information to go directly to and be posted for sale on an active online service and/or mobile application. The user may use cursor 170 to drill-down into each posted object to retrieve additional information about an automatically identified object such as category, type, median cost, number of products having a same type in inventory on the online service, and the like. The user may delete objects from the web page 160 via the cursor 170 or the user may activate objects by selecting them with the cursor 170 and entering a specific input command.

FIG. 2 illustrates a system architecture 200 for acquiring training data in accordance with example embodiments. In this example, user-generated data that is associated with the user, the user device, or the like, may be used to generate training data. Examples of data that may be used for training includes searches 210 performed by a user via a web browser or some other search mechanisms, product visits 220 which correspond to listings, advertisements, web pages, and the like, which are visited by the user using a web browser or other mechanism, conversation data 230 that can be captured from voice calls, text messages, emails, instant messages, and the like, and transaction data 240 representing objects which the user has previously posted, purchased, sold, or otherwise interacted with.

Figure 3A:
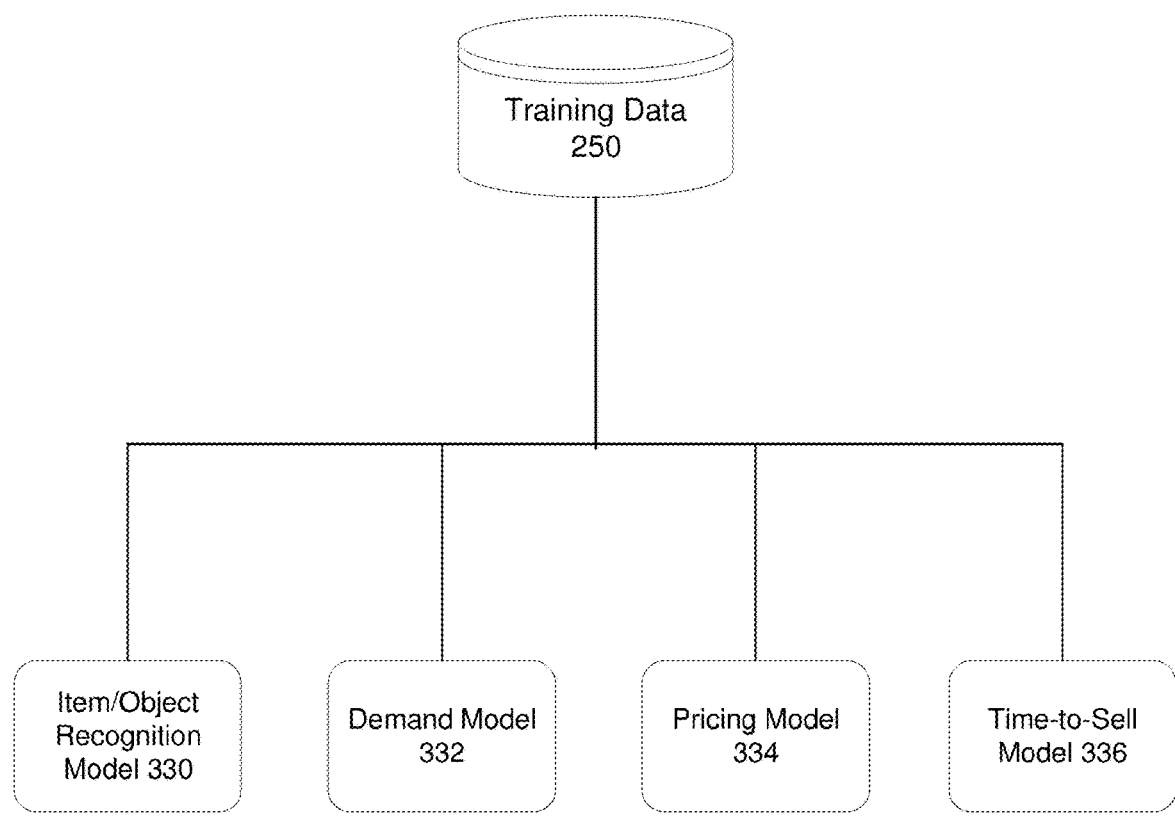
FIG. 3A is a diagram illustrating learning models capable of being trained using the training data, in accordance with an example embodiment.

Log data 212, 222, 232, and 242, may be kept by the system 200 and stored in a database 250 which may be stored on any of the mobile device and/or the server, as an example. The log data may include detailed location information identifying a geographical location of the user, a timestamp, web URL's, contact information of other users, a query entered by the user, a product ID of a product interacted with by the user via the mobile device, and the like. The log data 212, 222, 232, and/or 242 may be used to generate any of the machine learning models described herein such as an item/object identification model, a price prediction model, a time to sell prediction model, a demand model, and the like. The more log data that is acquired, the more accurate the trained learning models may become. FIG. 3A illustrates learning models capable of being trained using the training data, in accordance with an example embodiment, and FIG. 3B illustrates a user device interacting with the trained leaning models in accordance with an example embodiment. Referring to FIG. 3A, the learning models may be trained based on the training data stored in the database 250 of FIG. 2. For example, the training data may include data from active online listings and/or historical online inventory data from an online service, a mobile app, or the like. It should also be appreciated that the learning models may be trained using location-based data that allows the predictions to become geographically sensitive. In the example of FIG. 3A, the training data 250 may be used to train an object recognition model 330, a demand model 332, a pricing model 334, a time-to-sell model 336, and the like, which may be stored in the mobile application.

The object recognition model 330 may be a coarse-grained object recognition model that can identify a general product (such as a washing machine, a table, a mobile device, etc.). As another example, the object recognition model 330 may be a fine-grained item recognition that can recognize model types, categories, brand names, versions, and the like. Also, the object recognition model 330 can be a level of recognition between coarse-grained and fine grained. The demand model 332 may provide an indication of a level of demand for an identified object (e.g., high, low, medium, etc.). The pricing model 334 may predict a price of the identified object based on other similar objects currently posted or previously sold. The time-to-sell model 336 may predict an amount of time it will take to sell the identified object by posting it via the online service based on historical purchase patterns of similar objects. The models may be continuously updated and improved over time as additional training information is received as a result of the user interacting with the mobile application. In this way, the training models can be continuous.

Referring to FIG. 3B, the models may be implemented on any of a mobile device 340 or a host server (not shown). That is, the models 330, 332, 334, and 336 may be stored locally on the mobile device 340 and/or they may be stored remotely on the server. In some embodiments, the models 330-336 may be stored on both the mobile device 340 and the server, where the models on the server offer greater accuracy but take more time because they are interacted with via a network such as the Internet. In this case, the user may dynamically choose whether to have the model operated by the mobile device (faster) versus a model operated by the server (more accurate) based on the user's preference.

Meanwhile, in the example of FIG. 3B, the object recognition model 330 is implemented via a local computer vision model on the mobile device 340. Initially, the local computer vision model may be downloaded to the mobile device 340 from a server during the initial installation of the application and/or via one or more updates. By implementing the object recognition, the image data may be stored locally and not be transmitted via a network 350 but rather held locally making the image recognition process faster. In addition, the example of FIG. 3B has the demand model 332, the pricing model 334, and the time-to-sell model 336, implemented via an external source such as a web server, or other source such as a cloud platform, a database, or the like. Here, each model 332, 334, and 336 may have an application programming interface (API) which can be implemented by the mobile device 340 thereby enabling the mobile device 340 to communicate with the remote models via the network 350. For example, each API may identify respective services, communication protocols, etc. for communicating with each model and may be installed on the mobile device 340.

FIG. 4 illustrates a process 400 of capturing identified object data and auto-posting the identified object to an online listing in accordance with an example embodiment. Referring to FIG. 4, the process 400 is performed by a mobile device 410 interacting with a server 420. Here, the server 420 hosts an online listing 430 which includes an e-commerce service for posting second-hand goods for sale. In this example, the mobile device 410 scans a washing machine (object). The mobile application described herein may identify that the camera of the mobile device 430 is currently viewing the washing machine, in real-time and send information about the identified item, as well as location data and user/device data to the server 420. In response, the server 420 may predict attributes of the identified washing machine such as purchase price, demand, time-to-sell, and the like. The server 420 may provide this information to the mobile device 410 for display, in real-time, via a screen of the mobile device while the scanning operation is still occurring. Simultaneously, the server 420 may automatically post an online listing 430 of the identified washing machine to a web resource such as a mobile application, an active online service, and the like. All of these operations may be performed in a clickless fashion without the user inputting a command. Furthermore, each time the user moves the camera to a new object, the process may be repeated until the continuous clickless scanning operation is aborted or otherwise stopped.

In some embodiments, the application may request immediate feedback from a user of the mobile device 410. For example, when the system is trying to predict an object price based on a current image there is some ambiguity. For example, if the user points the mobile device at a smart phone it can be hard to distinguish whether the smart phone is a Samsung S7, a Samsung S8, a Samsung S9, etc. While these may be very similar in appearance, they may differ significantly in price/value, time to sell, and other attributes. Therefore, the system may request or recommend the user to move the item (e.g., flip it over) to allow the mobile device camera to capture more model data about the smart phone. This is especially helpful for objects such as smart phones, clothing (size information from tags), cars (e.g., opening a door to see model number), furniture (in case the user is selling the table but not the chairs), and the like. In some cases, the system can ask the user if the table alone is to be sold, or the table plus chairs (smart/learning), or may even suggest to the user that a more favorable sale price can be obtained by selling the table and chairs together.

As another example, the application may request the user to change the focus of the camera to make a label more readable, or to increase a size of a part of the object such as a brand name, a size, and the like. As another example, the system may recognize the specific model type or brand name, but may not ascertain various hidden or difficult to grasp attributes. For example, the application may recognize that the object is a camera, but may not be able to specify the type of lens included in the camera, etc. In this case, the application may generate a drop-down menu option with a list of possible selections to allow a user to quickly refine the information about the object. In the example of the camera lens, the drop-down may provide the user with a list of number of megapixels, etc.

By gathering immediate feedback from a user about the object being scanned, the application is able to better identify what the user is selling and can promote the object accordingly (e.g. full dining set instead of only a table) and also provide a more accurate valuation of the object. This refinement and feedback process allows the user to more accurately promote the object and provide better feedback on the correct price.

FIG. 5 illustrates a method 500 for a method for clickless identification of an object in accordance with example embodiments, and FIG. 6 illustrates a method 600 for clickless posting of a listing for an object in accordance with example embodiments. In some embodiments, the methods 500 and 600 may be performed as part of a same end-to-end process, or they may be performed separately. Also, it is not necessary that the method 500 be performed before the method 600, or vice versa, but rather some steps from each method may be performed concurrently, sequentially, or the like. In some embodiments, the methods 500 and 600 may be performed by a mobile application which is executing on a mobile device and which is hosted by a server such as a web server, host server, connected server, online server, or the like. It should also be appreciated that the steps in the methods 500 and 600 may be performed by the mobile device, by the server, or by a combination of both the mobile device and the server. That is, the methods described herein are not limited to being performed by a single device, nor are they limited to being performed by a single type of device. In yet other embodiments, the mobile device may be replaced with a different kind of device such as desktop PC, a kiosk, an appliance (such as a television), a smart-wearable device, or the like. Likewise, in some embodiments, the server may be replaced by a cloud platform, a database, a standalone server, a user device, or the like. It should also be appreciated that although some examples refer to a server hosting a website, the server described herein may be a server that hosts an online service, a mobile application, and the like, which is used to post and sell items via online listings.

Referring to FIG. 5, in 510, the method may include identifying an object included in image data obtained via a clickless image identification process. Here, the identifying may be performed while the image data is currently (continuously) being captured by an image capturing component associated with a mobile device. In other words, the camera (or other imaging component) may continuously capture images of an area while different objects are identified in the room or other area. The objects may be identified based on an outline, a shape, a size, a color, a pattern, other items nearby, and the like. In some embodiments, a group of objects (e.g., a table and chairs, a mouse and keyboard, a tablet and headphones, etc.) may be identified at the same time. In the examples herein, an object may include a three-dimensional object that is within a location of a room, a building, an outdoor area, and the like. The object may include different items that can be posted for sale via an online service such as a mobile application or website.

In 520, the method may include predicting one or more attributes of the identified object based on previous data of similar objects posted on a web resource. For example, the attributes may include a value of the object (e.g., purchase price, sale price, etc.). As another example, the attributes may include an expected length of time it will take for the user to sell the object via the web resource. Here, the expected length of time may have various timing fields such as a week, a day, an hour, a minute, a second, etc. indicating an expected sale time of the object via the web resource.

In 530, the method may include displaying an identifier of the identified object and the one or more predicted attributes of the identified object on a screen of the mobile device while the clickless image identification process is occurring. For example, the identifier may include an image/picture of the object or a name of the object. In some embodiments, the displaying of the identifier of the object may include displaying a live image of the object captured by a camera of the mobile device, a previously-selected or pre-defined image of the object stored by the mobile device or a remote web server, and the like.

In some embodiments, the identifying may include sequentially identifying a plurality of items during a continuous clickless image identification process based on movement of an imaging position of the image capturing component of the mobile device. In this example, each time a new object is identified during the clickless image identification process, the displaying may include removing a display of a previously identified object from the screen and newly displaying an identifier and one or more predicted attributes of the newly identified object on the screen. In some embodiments, the identifying of the object may be performed based on an optical recognition model that is stored locally on the mobile device. In some embodiments, the predicting of the one or more attributes may be performed via one or more predictive models that are stored remotely on a web server that is remotely connected to the mobile device.

Referring to FIG. 6, in 610, the method may include identifying an object included in image data obtained via a clickless image identification process. Here, the identifying may be performed while the image data is currently (continuously) being captured by an image capturing component associated with a mobile device. In other words, the camera (or other imaging component) may continuously capture images of an area while different objects are identified in the room or other area. The objects may be identified based on an outline, a shape, a size, a color, a pattern, other items nearby, and the like. In some embodiments, a group of objects (e.g., a table and chairs, a mouse and keyboard, a tablet and headphones, etc.) may be identified at the same time. In the examples herein, an object may include a three-dimensional object that is within a location of a room, a building, an outdoor area, and the like. The object may include different items that can be posted for sale via an online service such as a mobile application or website. In some embodiments, the image data of the object and/or other information about the object may be stored in a storage device that is local or remote with respect to the mobile device.

In 620, the method may include predicting one or more attributes of the identified object based on previous data of similar objects posted on a web resource. For example, the attributes may include a value of the object (e.g., purchase price, sale price, etc.) As another example, the attributes may include an expected length of time it will take for the user to sell the object via the web resource. Here, the expected length of time may have various timing fields such as a week, a day, an hour, a minute, a second, etc. indicating an expected sale time of the object via the web resource. The web resource may include one or more of a mobile application hosted by an application server and a website hosted by a host server In 630, the method may include generating and uploading a listing of the identified object included in the image data to the web resource. For example, the listing may include an image of the identified object and the one or more predicted attributes of the identified object. Here, the system may create the listing based on a template which includes pre-defined fields of data and a position of where to place an image or multiple images of the object. The listing may include an online posting which is stored on a website (e.g., a user's account page, etc.) of the website. As the user continues to scan the room, additional objects may be identified and multiple listings may be posted onto the website. Each listing may include an image (e.g., a live image captured of the object, or a pre-defined image of the object) and a plurality of values of the object.

In some embodiments, the method may include posting the listing to a web resource that is accessible to the mobile device while the clickless image identification process is still occurring. In some embodiments, the method may include generating the listing based on a plurality of predefined fields and transmit the listing to a host server of the web resource. Here, the predefined fields may be identified from a template. In some embodiments, the method may include sequentially identifying a plurality of objects during the clickless image identification process based on movement of an imaging position of the image capturing component of the mobile device. In some embodiments, the method may include automatically filling-in a web-based listing with the image of the identified object, a name of the identified object, a predicted value of the identified object, and a predicted time associated with the identified object.

For example, the auto-generated listing may include an image of the identified object taken from the image data (such as a frame of video, a photo, or the like), user data of a user associated with the mobile device (e.g., user account, user ID, device ID, etc.), and one or more of the predicted attributes of the identified object which may be inserted into predefined fields of the online listing. In some embodiments, the method may include auto-posting the newly generated listing via a web resource while the continuous clickless image identification process occurs.

In this example, each time a user scans a new object, information about the item can be automatically populated into a listing format and posted online to a live site such as within a selling cart or other landing page of a user's account on the online service. As another example, the online listing may be posted to a live/active online listing page where it can be directly viewed by another user. The auto-posting may occur while the continuous clickless image identification process is still occurring. In other words, the user does not have to stop and press a selection or submit any other type of commands (speech, input, gesture, etc.) because the posting is performed automatically and in a clickless fashion (i.e., clicklessly).

Figure 7:
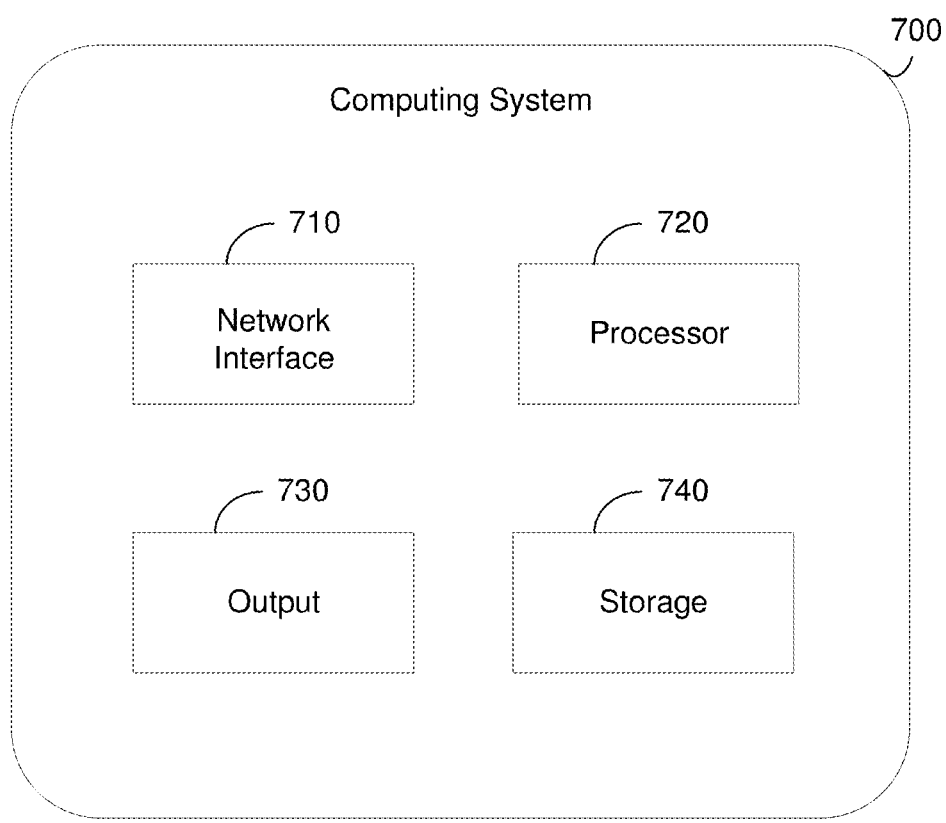
FIG. 7 is a diagram illustrating a computing device for performing the methods and processes of the example embodiments.

FIG. 7 illustrates a computing device 700 for performing the methods and processes of the example embodiments. For example, the computing device 700 may be a web server, a mobile device, a cloud platform, a database, an appliance, a kiosk, a combination of devices, and the like. It should be understood that the computing system 700 may perform the method 500 of FIG. 5 and the method 600 of FIG. 6. Referring to FIG. 7, the computing system 700 includes a network interface 710, a processor 720, an output 730, and a storage device 740 such as a memory. Although not shown in FIG. 7, the computing system 700 may include other components such as a display, one or more input units, a receiver, a transmitter, and the like.

The network interface 710 may transmit and receive data over a network such as the Internet, a private network, a public network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The output 730 may output data to an embedded display of the computing system 700, an externally connected display, a display connected to the cloud, another device, and the like. The output 730 may include a device such as a port, an interface, or the like, which is controlled by the processor 720. In some examples, the output 730 may be replaced by the processor 720. The storage device 740 is not limited to a particular storage device and may include any known memory device such as RAM, ROM, hard disk, and the like, and may or may not be included within the cloud environment. The storage device 740 may store ML models in a hard disk or long-term storage location and load the ML model from hard disk to RAM, a cache, or the like, during a deploying operation.

In an example embodiment, the processor 720 may identify an object included in image data via a continuous clickless image identification process, and predict one or more attributes of the identified object based on previous data of similar objects posted on an online service. The online service may be a web resource such as a mobile application, a website, or the like. According to various aspects, the identification may be performed by the processor 720 while the capturing of the image data is continuously occurring via a camera of a mobile device, in an example in which the process is performed by the mobile device. The output 730 may output a display of an identifier of the identified object and the one or more predicted attributes of the identified object to a screen of the mobile device while the continuous clickless image identification process is occurring. The identifier may include an image of the object on the screen (live image, preselected image, etc.) as well as a name of the object, and the like.

In another example embodiment, the processor 720 may be communicatively coupled to a memory such as storage 740 and may be configured to identify an object from image data via a continuous clickless image identification process that is performed while the image data is continuously being captured by a camera of a mobile device, predict one or more attributes of the identified object based on previous data of similar objects posted on an online service and stored in the memory. Furthermore, the processor 720 may auto-generate a new listing based on the identified object. In this example, the auto-generated listing may include an image of the identified object taken from the image data, user data of a user associated with the mobile device, and one or more of the predicted attributes of the identified object, and auto-post (e.g., upload, transmit, etc.) the newly generated listing via a web resource while the continuous clickless image identification process occurs.

According to various embodiments, one or more models for machine learning may be stored in the storage 740. For example, a trained model for image/item recognition, a price estimation model, a time to sell estimation model, a demand model, and the like, may be stored in the storage. Also, the models may be trained using data that is collected from an online service, a website, a user device, and the like, which may be aggregated and stored via one or more files in the storage 740.

The example embodiments improve upon the prior art by enabling a user device to scan a room or other area using a camera or other imaging element and automatically identify items that could be posted for sale to an online service. In some embodiments, the user device is configured using software (e.g., mobile application, etc.). The software can identify what is being scanned in real-time and also predict attributes about the item with respect to similar items posted on the online service. The identification of the item and the predicted attributes can be displayed in real-time on a screen of the user device while the user device is capturing an image of the item. Furthermore, the user device can continuously scan the room in a clickless fashion and the user device can seamlessly detect another item without requiring the user to make any selections. In response to detecting the next item, the screen of the user device can be updated by the software in real-time to provide information and predicted attributes of the next item being scanned.

In addition to providing information about the item on the screen of the user device, the item can be posted to an online service or other web resource associated with the user device such as a listing of a mobile application. To perform the posting of the listing for the item, the software may auto-fill a listing for the automatically identified item with the predicted attributes and other information about the item and the user, and submit the information to a web resource. The auto-listing process may be performed in a continuous and clickless manner without requiring a user to input any information such as price, description, etc., or to capture and post images of the item, because it is all taken care automatically and seamlessly by the software.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a processor configured to identify, via a mobile application, an object included in image data obtained via a clickless image identification process, wherein the identifying is performed while the image data is being captured by an image capturing component of a mobile device; and
   a storage configured to store information about the image data obtained via the clickless image identification process,
   wherein the processor is further configured to predict, via one or more learning models of the mobile application, a price value, a demand value, and a time-to-sell value of the already identified object based on a type of the already identified object and additional attributes of other objects of a same type, and display an identifier of the object and the predicted price value, the predicted demand value, and the predicted time-to-sell value on a screen of the mobile device while the clickless image identification process is occurring.

2. The computing system of claim 1, wherein the processor is configured to sequentially identify a plurality of items during a continuous clickless image identification process based on movement of an imaging position of the image capturing component of the mobile device.

3. The computing system of claim 2, wherein, each time a new object is identified during the clickless image identification process, the processor removes a display of an identifier of a previously identified object from the screen and newly displays an identifier and one or more predicted attributes of the newly identified object on the screen.

4. The computing system of claim 1, wherein the object comprises a three-dimensional object included in image data captured by a camera of the mobile device during the clickless image identification process.

5. The computing system of claim 1, wherein the processor is configured to predict, via the one or more learning models of the mobile application, the price value of the already identified object based on sales price values of the other objects of the same type.

6. The computing system of claim 1, wherein the processor is configured to predict, via the one or more learning models of the mobile application, the time-to-sell value representing a length of time before a purchase of the already identified object based on length of time to sell values of the other objects of the same type.

7. The computing system of claim 1, wherein the processor is configured to predict the price value, the demand value, and the time-to-sell value via one or more predictive models that are stored remotely on a web server that is remotely connected to the mobile device.

8. The computing system of claim 1, wherein the processor is configured to display a live image of the object captured by a camera of the mobile device and a name of the object determined from the image data.

9. A method comprising:
   identifying, via a mobile application, an object included in image data obtained via a clickless image identification process, wherein the identifying is performed while the image data is being captured by an image capturing component associated with a mobile device;
   predicting, via one or more learning models of the mobile application, a price value, a demand value, and a time-to-sell value, of the already identified object based on a type of the already identified object and additional attributes of other objects of a same type; and
   displaying an identifier of the object and the predicted price value, the predicted demand value, and the predicted time-to-sell value on a screen of the mobile device while the clickless image identification process is occurring.

10. The method of claim 9, wherein the identifying comprises sequentially identifying a plurality of items during a continuous clickless image identification process based on movement of an imaging position of the image capturing component of the mobile device.

11. The method of claim 10, wherein, each time a new object is identified during the clickless image identification process, the displaying comprises removing a display of an identifier of a previously identified object from the screen and newly displaying an identifier and one or more predicted attributes of the newly identified object on the screen.

12. The method of claim 9, wherein the identifying of the object is performed via an optical recognition model that is stored locally on the mobile device.

13. The method of claim 9, wherein the predicting, via the one or more learning models of the mobile application, comprises predicting the price value of the already identified object based on sales price values of the other objects of the same type.

14. The method of claim 9, wherein the predicting, via the one or more learning models of the mobile application, comprises predicting the time-to-sell value representing a length of time before a purchase of the already identified object based on length of time to sell values of the other objects of the same type.

15. A computing system comprising:
   a processor configured to identify, via a mobile application, an object included in image data obtained via a clickless image identification process, wherein the identification is performed while the image data is being captured by an image capturing component of a mobile device; and
   a storage configured to store information about the image data of the object,
   wherein the processor is further configured to predict, via one or more learning models of the mobile application, a price value, a demand value, and a time-to-sell value of the already identified object based on a type of the already identified object and additional attributes of other objects of a same type stored on a web resource, and upload a listing of the object included in the image data to the web resource, the listing comprising an image of the identified object and the predicted price value, the predicted demand value, and the predicted time-to-sell value.

16. The computing system of claim 15, wherein the web resource comprises one of a mobile application hosted by an application server and a website hosted by a host server.

17. The computing system of claim 15, wherein the processor is configured to post the listing to a web resource that is accessible to the mobile device while the clickless image identification process is still occurring.

18. The computing system of claim 15, wherein the processor is further configured to generate the listing based on a plurality of predefined fields and transmit the listing to a host server of the web resource.

19. The computing system of claim 15, wherein the processor is configured to sequentially identify a plurality of objects during the clickless image identification process based on movement of an imaging position of the image capturing component of the mobile device.

20. The computing system of claim 15, wherein the processor is configured to automatically fill-in a web-based listing with the image of the identified object, a name of the identified object, the predicted price value of the identified object, and the predicted time-to-sell value of the identified object.

* * * * *